(12) United States Patent
Burden et al.

(10) Patent No.: US 12,240,139 B2
(45) Date of Patent: Mar. 4, 2025

(54) CHAIN SAW LUBRICATION PUMP AND CONTROL SYSTEMS AND METHODS

(71) Applicant: TECHTRONIC CORDLESS GP, Anderson, SC (US)

(72) Inventors: Andrew Burden, Newnan, GA (US); Miles Hsu, Marietta, GA (US); Isabel Novak, Fairview, NC (US); Bahiru Woldemariam, Snellville, GA (US); Daniel Yameen, Quincy, MA (US)

(73) Assignee: TECHTRONIC CORDLESS GP, Anderson, SC (US)

( * ) Notice: Subject to any disclaimer, the term of this patent is extended or adjusted under 35 U.S.C. 154(b) by 356 days.

(21) Appl. No.: 17/545,897

(22) Filed: Dec. 8, 2021

(65) Prior Publication Data

US 2023/0173708 A1 Jun. 8, 2023

(51) Int. Cl.
  *B27B 17/12* (2006.01)
  *B27B 17/02* (2006.01)
  *F16N 7/38* (2006.01)

(52) U.S. Cl.
  CPC .............. *B27B 17/12* (2013.01); *B27B 17/02* (2013.01); *F16N 7/38* (2013.01)

(58) Field of Classification Search
  CPC ....... Y10T 83/263; B23D 59/02; B27B 17/02; B27B 17/025; B27B 17/12; F16N 7/38
  USPC ........................... 83/169; 30/123.4; 184/15.1
  See application file for complete search history.

(56) References Cited

U.S. PATENT DOCUMENTS

| | | | | |
|---|---|---|---|---|
| 2,748,810 A | * | 6/1956 | Strunk | B27B 17/12 30/387 |
| 3,213,605 A | * | 10/1965 | Welden | F01B 23/06 60/434 |
| 3,844,380 A | * | 10/1974 | Batson | F16N 13/06 184/15.1 |
| 3,865,213 A | * | 2/1975 | McDermott | F02B 63/02 123/196 CP |
| 4,589,386 A | * | 5/1986 | Everts | F02M 1/16 261/DIG. 8 |
| 4,760,646 A | * | 8/1988 | Siegler | A01G 3/08 30/388 |

(Continued)

FOREIGN PATENT DOCUMENTS

EP  0180742 A1 * 5/1986 ............... F16N 7/02

OTHER PUBLICATIONS

EP-0180742-A1 English Translation; May 14, 1986; Henning Volker; F16N7/02.*

*Primary Examiner* — Laura M Lee
(74) *Attorney, Agent, or Firm* — Dority & Manning, P.A.

(57) ABSTRACT

A lubrication system for a chainsaw, the lubrication system including a reservoir housing a lubricant, a fluid conduit extending between the reservoir and a location adjacent to a chain of the chainsaw, a pump configured to move lubricant from the reservoir to the location adjacent to the chain, and a valve disposed along the fluid conduit. The valve has a lubricant inlet that receives lubricant from the reservoir, an air inlet, and an outlet that provides lubricant to the location adjacent to the chain. The valve is movable between an open position whereby lubricant passes from the lubricant inlet to the outlet and a closed position whereby the outlet is in fluid communication with the air inlet. The valve moves between the open and closed positions in response to a user input.

20 Claims, 4 Drawing Sheets

(56) References Cited

U.S. PATENT DOCUMENTS

| | | | | |
|---|---|---|---|---|
| 4,802,555 | A * | 2/1989 | Matsunaga | B27B 17/12 |
| | | | | 184/55.1 |
| 5,069,177 | A * | 12/1991 | Dokonal | F01M 5/025 |
| | | | | 123/196 R |
| 5,184,403 | A * | 2/1993 | Schliemann | B27B 17/12 |
| | | | | 30/382 |
| 5,845,402 | A * | 12/1998 | Leini | A01G 23/091 |
| | | | | 144/34.1 |
| 6,622,387 | B2 * | 9/2003 | Uhl | F16N 9/04 |
| | | | | 137/587 |
| 8,151,783 | B2 * | 4/2012 | Baratta | B23D 61/026 |
| | | | | 451/523 |
| 8,661,951 | B2 * | 3/2014 | Gorenflo | B27B 17/083 |
| | | | | 83/61 |
| 9,925,685 | B2 * | 3/2018 | Kawamura | B27B 17/12 |
| 10,307,931 | B2 * | 6/2019 | Haney | F16N 7/385 |
| 2002/0017023 | A1 * | 2/2002 | Uhl | B27B 17/00 |
| | | | | 30/123.4 |
| 2009/0193669 | A1 * | 8/2009 | Gorenflo | B27B 17/083 |
| | | | | 30/277.4 |
| 2012/0061393 | A1 * | 3/2012 | Okouchi | B25F 5/00 |
| | | | | 220/212 |
| 2015/0151447 | A1 * | 6/2015 | Petersson | B23D 47/12 |
| | | | | 318/722 |
| 2015/0298344 | A1 * | 10/2015 | Hallendorff | F16N 19/00 |
| | | | | 184/15.1 |
| 2017/0021523 | A1 * | 1/2017 | Haney | B27B 17/12 |
| 2017/0120471 | A1 * | 5/2017 | Kawamura | B27B 17/12 |
| 2022/0186687 | A1 * | 6/2022 | Tamas | F02M 17/36 |

* cited by examiner

CHAIN SAW LUBRICATION PUMP AND CONTROL SYSTEMS AND METHODS

FIELD

The present disclosure relates generally to chainsaws, and more particularly to chainsaw lubrication pump and reservoir control systems.

BACKGROUND

Chainsaws cut through material using chains with cutting teeth. The chain is typically disposed in a track on a guide bar. The chain moves relative to the track, advancing the cutting teeth along the material being cut.

Frictional resistance between the chain and guide bar decreases chainsaw efficiency. That is, the additional resistance between the chain and guide bar results in decreased energy capacity and fewer cuts which can be made between charging or refueling. To solve this problem, lubrication may be introduced between the chain and guide bar. However, too much lubrication can attract debris, interfere with electronic components of the chainsaw, create a worse user experience, or even cause dripping.

Accordingly, improved chainsaw oiling systems are desired in the art. In particular, chainsaw lubrication systems which offer better use and operation would be advantageous.

BRIEF DESCRIPTION

Aspects and advantages of the invention in accordance with the present disclosure will be set forth in part in the following description, or may be obvious from the description, or may be learned through practice of the technology.

In accordance with one embodiment, a chainsaw is provided. The chainsaw includes a housing; a guide bar extending from the housing; a chain dispose around the guide bar and driven by a prime mover; a user input controlling movement of the chain about the guide bar; and a lubrication system that provides lubricant to the chain, the lubrication system comprising: a reservoir housing the lubricant; a fluid conduit extending between the reservoir and a location adjacent to the chain; a pump configured to move lubricant from the reservoir to the location adjacent to the chain; and a valve disposed along the fluid conduit, the valve having a lubricant inlet that receives lubricant from the reservoir, an air inlet, and an outlet that provides lubricant to the location adjacent to the chain, wherein the valve is movable between an open position whereby lubricant passes from the lubricant inlet to the outlet and a closed position whereby the outlet is in fluid communication with the air inlet, and wherein the valve moves between the open and closed positions in response to the user input.

In accordance with one embodiment, a lubrication system for a chainsaw is provided. The lubrication system for the chainsaw includes a reservoir housing a lubricant; a fluid conduit extending between the reservoir and a location adjacent to a chain of the chainsaw; a pump configured to move lubricant from the reservoir to the location adjacent to the chain; and a valve disposed along the fluid conduit, the valve having a lubricant inlet that receives lubricant from the reservoir, an air inlet, and an outlet that provides lubricant to the location adjacent to the chain, wherein the valve is movable between an open position whereby lubricant passes from the lubricant inlet to the outlet and a closed position whereby the outlet is in fluid communication with the air inlet, and wherein the valve moves between the open and closed positions in response to a user input.

In accordance with one embodiment, a method of operating a chainsaw is provided. The method includes activating a trigger of the chainsaw to initiate a prime mover of the chain saw, the prime mover being coupled to a chain of the chainsaw; and instructing an actuator to reconfigure a valve of a lubrication system of the chainsaw from a closed position to an open position in response to the activated trigger, wherein in the closed position the valve permits airflow through the valve, and wherein in the open position the valve permits lubricant to flow from a reservoir to a location adjacent to the chain.

These and other features, aspects and advantages of the present invention will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present invention, including the best mode of making and using the present systems and methods, directed to one of ordinary skill in the art, is set forth in the specification, which makes reference to the appended figures, in which.

DETAILED DESCRIPTION

Reference now will be made in detail to embodiments of the present invention, one or more examples of which are illustrated in the drawings. The word "exemplary" is used herein to mean "serving as an example, instance, or illustration." Any implementation described herein as "exemplary" is not necessarily to be construed as preferred or advantageous over other implementations. Moreover, each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components. The singular forms "a," "an," and "the" include plural references unless the context clearly dictates otherwise. The terms "coupled," "fixed," "attached to," and the like refer to both direct coupling, fixing, or attaching, as well as indirect coupling, fixing, or attaching through one or more intermediate components or features, unless otherwise specified herein. As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive- or and not to an exclusive- or. For example, a condition A or B is satisfied by any one of the following: A is true (or present) and B is false (or not present), A is false (or not present) and B is true (or present), and both A and B are true (or present).

Terms of approximation, such as "about," "generally," "approximately," or "substantially," include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

Benefits, other advantages, and solutions to problems are described below with regard to specific embodiments. However, the benefits, advantages, solutions to problems, and any feature(s) that may cause any benefit, advantage, or solution to occur or become more pronounced are not to be construed as a critical, required, or essential feature of any or all the claims.

In general, chainsaws described herein can utilize lubrication systems which more precisely dispense lubricant during operation of the chainsaw. The lubrication systems described herein can allow for sufficient lubrication of the chainsaw while preventing excessive lubrication or leakage which may occur in traditional chainsaws. Utilizing systems and methods described herein can therefore increase operational lifespan of the chainsaw while decreasing leakage caused by excessive lubricant which may occur while the chainsaw is inactive, stored, or otherwise not in use.

Figure 1:
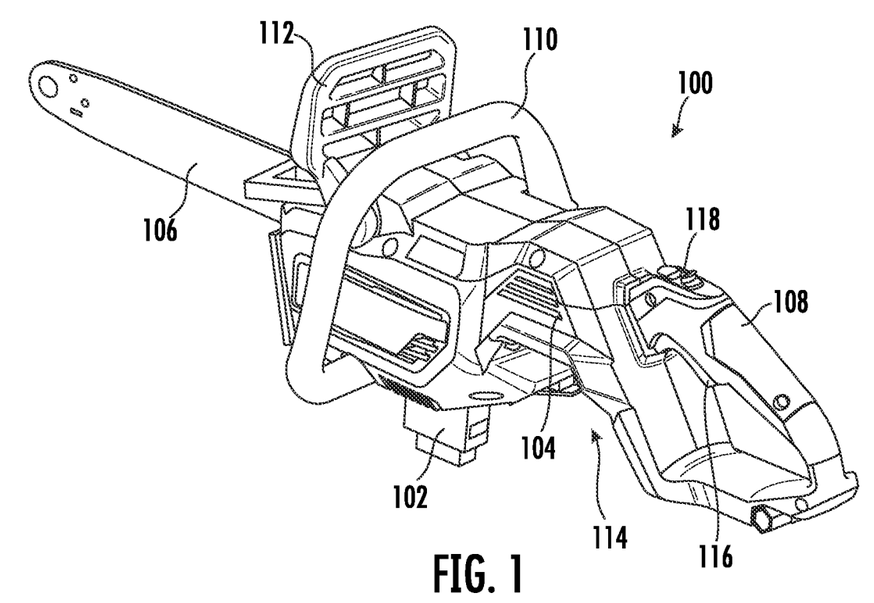
FIG. 1 is a perspective view of a chainsaw in accordance with an exemplary embodiment of the present disclosure.
Figure 2:
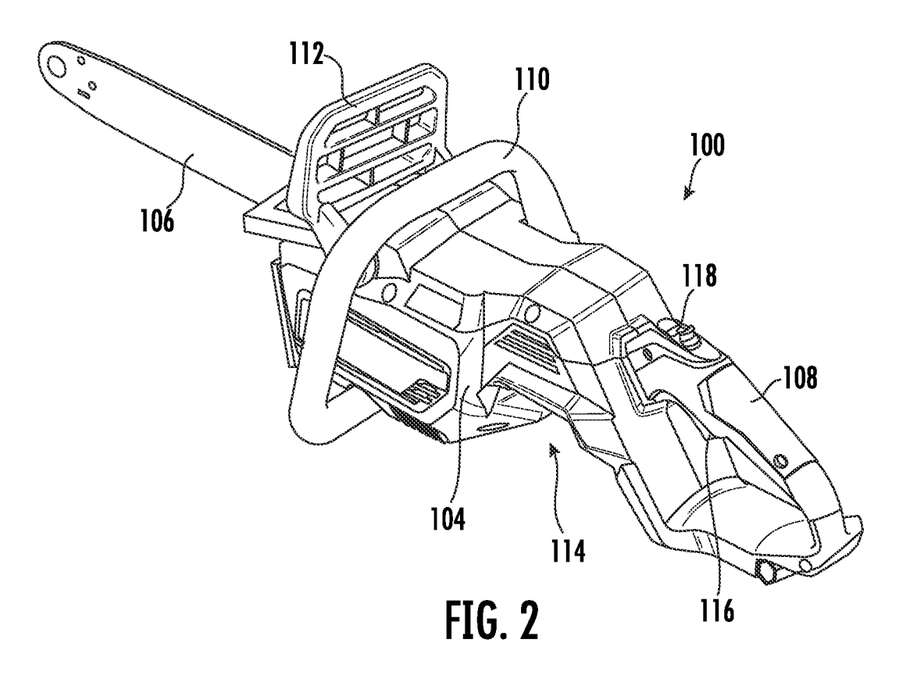
FIG. 2 is a perspective view of a chainsaw in accordance with another exemplary embodiment of the present disclosure.

Referring to the figures, FIGS. 1 and 2 illustrate perspective views of chainsaws 100 in accordance with exemplary embodiments of the present disclosure. FIG. 1 illustrates a chainsaw 100 having a lubrication system 102 disposed at least partially external to a housing 104 of the chainsaw 100.

FIG. 2 illustrates a chainsaw 100 having a lubrication system (not seen) disposed within the housing 104. The chainsaws 100 can further include a guide bar 106 that receives a chain (not illustrated), a handle 108, a secondary handle 110, a protective element 112 which may be operably coupled to a braking mechanism of the chainsaw 100, a battery receiving area 114 which can receive one or more batteries (not illustrated) to power the chainsaw 100, or any combination thereof.

A user interface, e.g., a trigger 116, can be disposed at a location whereby an operator can control operation of the chainsaw 100. The trigger 116 can control a prime mover (not illustrated) of the chainsaw 100 to drive the chain along the guide bar 106. By way of non-limiting example, the prime mover can include a motor having an output shaft. The output shaft can be in communication with the chain, e.g., through a gear, so as to move the chain along the guide bar 106. A sensor (not illustrated) can detect the relative position of the trigger 116. When the trigger 116 is activated, e.g., depressed, the speed of the prime mover can increase. Conversely, when the trigger 116 is deactivated, e.g., not depressed, the prime mover can stop. In certain instances, the prime mover can be a variable speed motor and a relative activated position of the trigger 116 can inform the speed of the variable speed motor. That is, the operator can control the speed of the chain along the guide bar 106 based on how far the trigger 116 is depressed.

A secondary user interface, e.g., a power button 118, can be used to control another aspect of the chainsaw 100. The power button 118 can include, for example, a toggle which can be moved between ON and OFF positions. The chainsaw 100 may not function when the power button 118 is in the OFF position.

Figure 3:
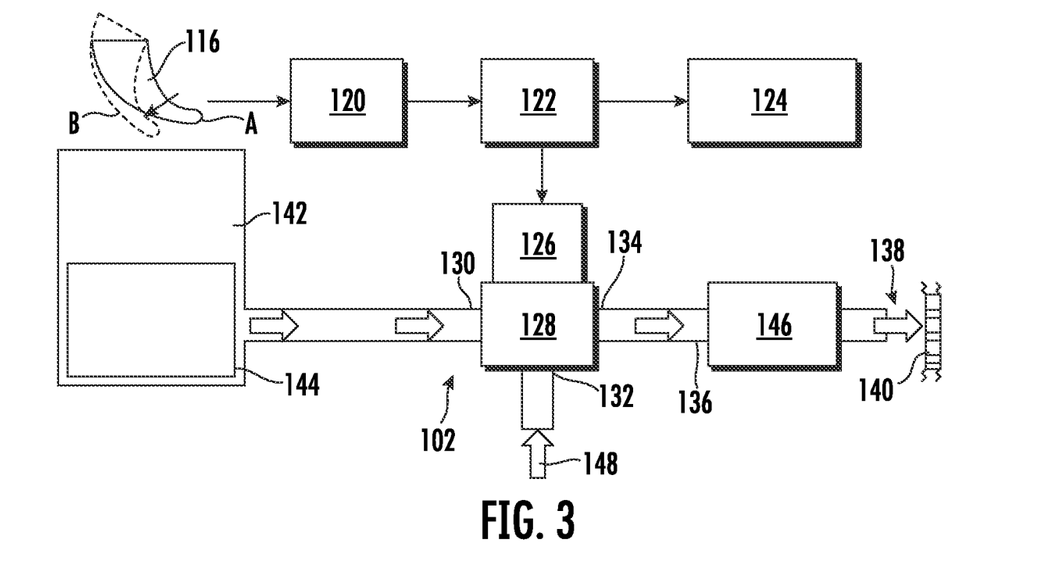
FIG. 3 is a schematic view of the chainsaw including a lubrication system in accordance with an exemplary embodiment of the present disclosure.

FIG. 3 illustrates a schematic view of a lubricating operation in accordance with an exemplary embodiment of the present disclosure. The lubricating operation can provide lubricant at an interface between the guide bar 106 and the chain so as to reduce friction and binding therebetween.

In general, the lubricating operation can initiate when the operator pulls the trigger 116 from the deactivated position A to the activated position B. This may be referred to as user input. It should be noted that in one or more embodiments, the power button 118 must also be in the ON position to initiate the lubricating operation. As the user provides input, a sensor 120 can detect activation of the trigger 116. The sensor 120 can be in communication with an electronic control unit (ECU) 122 which can receive information regarding the status of the trigger 116. For instance, the sensor 120 can communicate whether the trigger 116 is being depressed, a degree to which the trigger 116 is being depressed, or the like. The ECU 122 may be integrally part of the chainsaw 100. By way of example, the ECU 122 may be part of a printed circuit board (PCB) of the chainsaw 100. The ECU 122 may include, for example, a processor and a memory storage unit. The memory storage unit can store instructions which can be executed by the processor. For instance, the ECU 122 may control a primary functional tool 124 of the chainsaw 100, such as the prime mover. When the trigger 116 is activated, the ECU 122 can instruct the prime mover to drive the chain according to how far the trigger 116 is activated. Conversely, when the trigger 116 is deactivated, the ECU 122 can instruct the prime mover to terminate driving the chain.

The ECU 122 may also be in communication with the lubrication system 102 so as to control an aspect of the lubrication system 102. For example, the ECU 122 may be in communication with an actuator 126 of the lubrication system 102. The actuator 126 can include, for example, a rotary actuator, a hydraulic actuator, a pneumatic actuator, an electric actuator, a thermal actuator, a magnetic actuator, a mechanical actuator, an electro-mechanical actuator, or the like. In a particular embodiment, the actuator 126 is a servo-motor. The servo-motor can be coupled to the one or more batteries of the chainsaw 100 to receive power therefrom. The actuator 126 can receive instructions from the ECU 122 informing an operational action to be taken by the actuator 126. For instance, by way of non-limiting example, the ECU 122 may instruct the actuator 126 to rotate an actuator output shaft in a first direction or a second direction.

The actuator 126 can be coupled with a valve 128. When the actuator output shaft rotates in the first direction, the valve 128 can be moved to a first configuration. When the actuator output shaft rotates in the second direction, the valve 128 can be moved to a second configuration different than the first configuration. By way of example, the first configuration can correspond with the valve 128 being in a closed position and the second configuration can correspond with the valve 128 being in an open position.

As depicted in FIG. 3, in accordance with one or more embodiments the valve 128 can be a three-way valve. The three-way valve can define a lubricant inlet 130, an air inlet 132, and an outlet 134. When the valve 128 is in the closed position, the outlet 134 can be in fluid communication with the air inlet 132. When the valve 128 is in the open position, the outlet 134 can be in fluid communication with the lubricant inlet 130. In this regard, lubricant can be provided along a fluid conduit 136 to a location 138 adjacent to the chain 140 so as to lubricate the chain 140.

The fluid conduit 136 can be in fluid communication with a reservoir 142 housing lubrication 144. The fluid conduit 136 can further be in fluid communication with a pump 146. With the valve 128 in the open position, the pump 146 can draw lubrication 144 from the reservoir 142 along the fluid conduit 136 and provide the lubrication at the location 138 adjacent to the chain 140.

In an embodiment, the pump 146 can be driven by the prime mover. Thus, when the trigger 116 is activated, i.e., depressed, the prime mover can drive both the chain 140 and the pump 146. Since the ECU 122 opens the valve 128 when the trigger 116 is activated, e.g., upon activation of the trigger 116, the prime mover can cause lubrication 144 to be dispensed at the location 138 adjacent to the chain 140.

When the trigger 116 is deactivated, i.e., the operator ceases to depress the trigger 116, the sensor 120 can detect the trigger 116 returning to the deactivated position A. The sensor 120 can communicate this information to the ECU 122 which can instruct the actuator 126 to close the valve 128. With the valve 128 closed, the outlet 134 becomes fluidly coupled with the air inlet 132. In this regard, air 148 can enter the valve 128 and pass through the fluid conduit 136, or at least the portion of the fluid conduit 136 disposed between the valve 128 and the location 138 adjacent to the chain 140. As such, any remaining suction within the conduit 136 after closing the valve 128 is released, protecting both the valve 128 and the pump 146.

Figure 4:
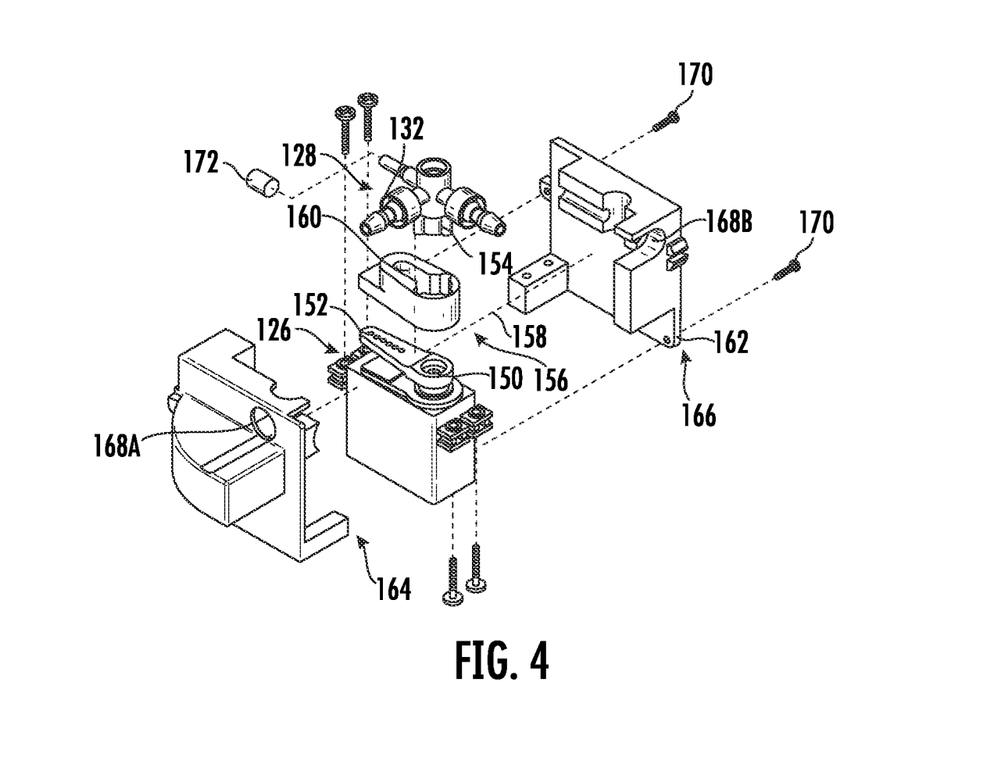
FIG. 4 is an exploded perspective view of the lubrication system in accordance with an exemplary embodiment of the present disclosure.

FIG. 4 is an exploded perspective view of a portion of the lubrication system 102 in accordance with an embodiment of the present disclosure. The actuator includes an actuator output shaft 150 with an arm 152 coupled therewith. In the exemplary embodiment depicted in FIG. 4, the arm 152 extends in a direction generally perpendicular with the actuator output shaft 150. As the actuator output shaft 150 rotates, the arm 152 translates within an X-, Y-plane about a pivot point associated with an axis of the actuator output shaft 150. The arm 152 is coupled with a handle 154 of the valve 128. Accordingly, the valve 128 is moved between the open and closed positions as the actuator 126 is operated.

In one or more embodiments, an interface 156 can be disposed between the arm 152 and the handle 154. The interface 156 can generally include a first pocket 158 configured to receive the arm 152 and a second pocket 160 configured to receive the handle 154. The interface 156 can transfer torque from the actuator 126 to the valve 128. In another embodiment, the valve 128 can be directly coupled to the actuator 126 without use of the interface 156. For instance, the actuator output shaft 150 can be fixed to the handle 154, or a shaft to which the handle 154 is affixed.

In some instances, the lubrication system 102 can be integrated into the housing 104 such that the lubrication system 102 is disposed therein. On other instances, the lubrication system 102 can be disposed at least partially outside of the housing 104. In these instances, the lubrication system 102 can include an enclosure 162 which protects the lubrication system 102. By way of example, the enclosure 162 can include a multi-piece design. The multi-piece design can include, for example, a first piece 164 and a second piece 166 which join together using, e.g., fasteners 170 to protect the lubrication system 102. In certain instances, the enclosure 162 can define one or more openings, e.g., openings 168A and 168B, through which the valve 128 or the fluid conduit 136 (FIG. 3) can extend through.

An air filter 172 may be utilized along the air inlet 132 to prevent ingress of debris into the valve 128. By way of non-limiting example, the air filter 172 can include an open cell foam, cloth, webbing, a solid filter material, a loose filter material, a ceramic filter, or the like. In certain instances, the air filter 172 can include a multi-piece, e.g., multi-stage, construction. For example, the air filter 172 can include an outer mesh configured to prevent ingress of large debris and a finer filter configured to prevent ingress of fine debris particles.

Figure 5:
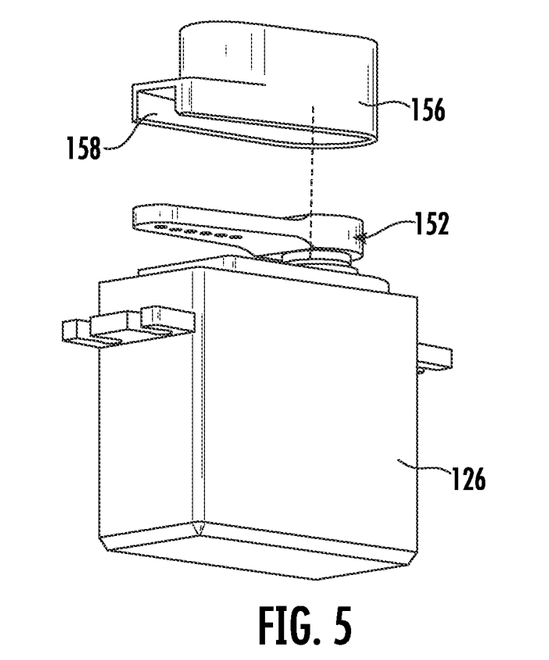
FIG. 5 is a bottom perspective view of a portion of the lubrication system in accordance with an exemplary embodiment of the present disclosure.
Figure 6:
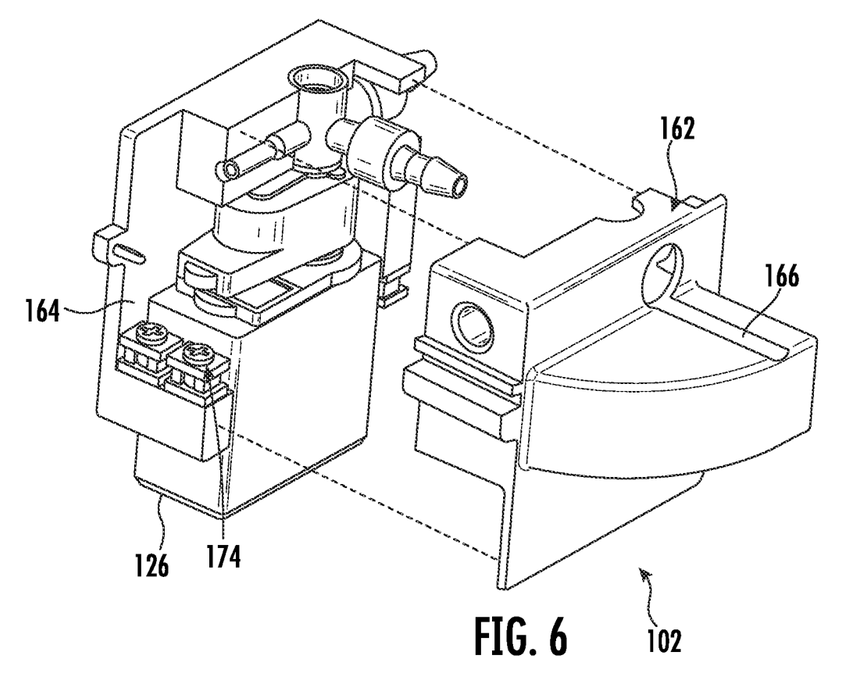
FIG. 6 is a partially exploded perspective view of the lubrication system in accordance with an exemplary embodiment of the present disclosure.

FIG. 5 depicts a bottom perspective view of the actuator 126 and interface 156 depicting the first pocket 158 configured to receive the arm 152 of the actuator 126. FIG. 6 illustrates a view of the lubrication system 102 with the second piece 166 of the enclosure 162 removed from the remainder of the lubrication system 102. As depicted, fasteners 174 can be used to secure the actuator 126 to at least the first piece 164 of the enclosure 162.

Figure 7:
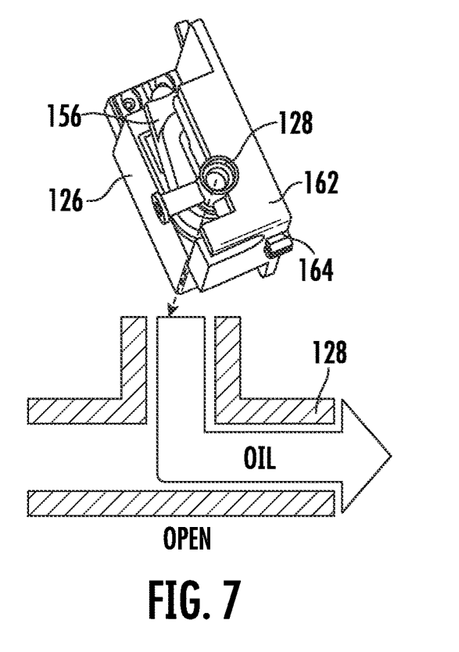
FIG. 7 is a top perspective view of the lubrication system and a schematic view of a valve of the lubrication system in accordance with an exemplary embodiment of the present disclosure as seen when the valve is in the open position.
Figure 8:
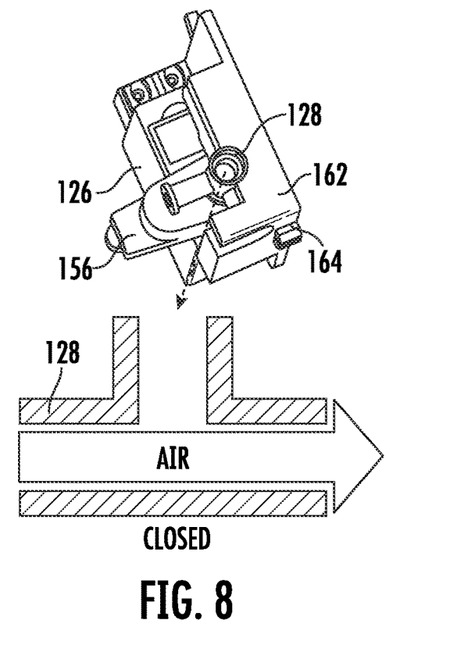
FIG. 8 is a top perspective view of the lubrication system and a schematic view of a valve of the lubrication system in accordance with an exemplary embodiment of the present disclosure as seen when the valve is in the closed position.

FIGS. 7 and 8 illustrate top perspective views of portions of the lubrication system 102 including the actuator 126, the interface 156, the valve 128, and the first piece 164 of the enclosure 162, and schematic views of the position of the valve 128 in the corresponding open position (FIG. 7) and the closed position (FIG. 8). As depicted, the open and closed positions are angularly separated from one another by approximately 90 degrees. In certain instances, the actuator 126 is configured to quickly move (e.g., within 1 second, such as within 0.5 seconds, such as within 0.25 seconds, such as within 0.1 second) the valve 128 between the open and closed or closed and open positions. In other instances, the actuator 126 may be configured to angularly displace the valve 128 to positions where the valve 128 is partially open, partially closed, or the like.

As described above, the valve 128 is moved between the open and closed positions when the trigger 116 is deactivated, i.e., returned to a rest position. In one or more embodiments it may be beneficial to delay closing of the valve (FIG. 8) immediately upon deactivating the trigger 116. The prime mover and chain may continue to move for a duration of time after the trigger 116 is deactivated. This continued movement may be caused, e.g., by momentum of the prime mover or chain. During this duration of time while the prime mover and chain are still moving but the trigger 116 is not activated, it may still be desirable to maintain the lubricating operation described herein so as to prevent unnecessary wear on the chainsaw 100. Moreover, during the duration of time between deactivating the trigger 116 and termination of the prime mover, the pump 146 (which may be driven by the prime mover) may continue to run. If the valve 128 is open and the pump 146 is running, the fluid conduit 136 can draw unnecessary air which can negatively impact performance. In an embodiment, the duration of time can be at least 0.25 seconds, such as at least 0.5 seconds, such as at least 1 second, such as at least 2 seconds, such as at least 3 seconds. In another embodiment, the duration of time can correspond with a sensed termination of rotation to the prime mover. That is, the valve 128 can close after motion of the prime mover terminates.

When the operator restarts the chainsaw 100 by activating the trigger 116, the lubrication system 102 can again provide lubrication. In certain instances, the valve 128 may be opened prior to the prime mover reaching the desired speed. In other instances, the valve 128 can be opened while the prime mover is reaching the desired speed. In yet other instances, the valve 128 may open after the prime mover has reached the desired speed. If instances where the valve 128 does not open before the prime mover has started moving, the pump 146 may draw air 148 (FIG. 3) from the air inlet 132 through the fluid conduit 136 so as to prevent damaging the pump 146 or other features of the chainsaw 100.

In an embodiment, the lubrication system 102 can be selectively utilized. For instance, the chainsaw 100 can include a user interface (not illustrated) configured to selectively engage and disengage operation of the lubrication system 102. By way of a non-limiting example, the operator may not want lubrication dispensed during certain cutting operations or when servicing the chainsaw 100. With the lubrication system 102 disengaged (i.e., the valve 128 is in the closed position), air 148 can be drawn through the conduit 136 so as to prevent damage to the components of the chainsaw 100 which might occur if the conduit 136 were to operate under vacuum with the valve 128 in the closed position without an air inlet.

Figure 9:
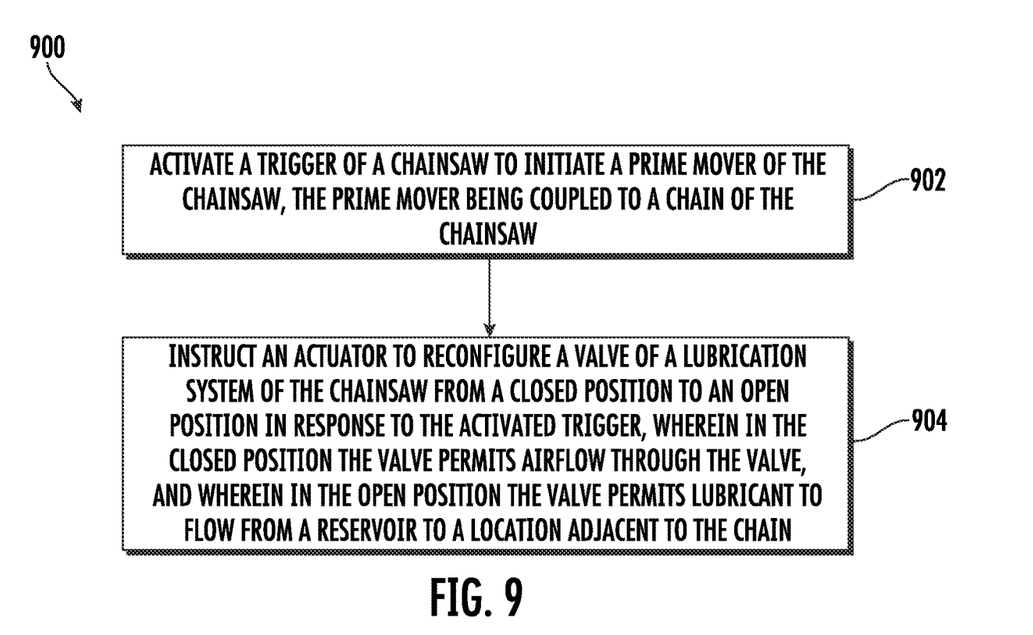
FIG. 9 is a flow chart of a method of operating a chainsaw in accordance with an exemplary embodiment of the present disclosure.

FIG. 9 illustrates a flow chart of a method 900 of operating a chainsaw. The method 900 includes a step 902 of activating a trigger of a chainsaw to initiate a prime mover of the chainsaw. The prime mover is coupled to a chain of the chain saw. The method 900 further includes a step 904 of instructing an actuator to reconfigure a valve of a lubrication system of the chainsaw from a closed position to an open position in response to the activated trigger. In the closed position, the valve can permit airflow through the valve. In the open position, the valve can permit lubricant to flow from a reservoir to a location adjacent to the chain.

In an embodiment, the method 900 can further include a step of instructing the actuator to reconfigure the valve from the open position to the closed position in response to deactivating the trigger. Reconfiguring the valve can be performed in certain instances after a delay time associated with a duration of time required to stop movement of the chain. By way of example, this can be a fixed time delay (e.g., 3 seconds) which starts when the trigger is deactivated. In certain instances, reconfiguration of the valve to the closed position can be performed after movement of the prime mover terminates. For instance, the valve can be closed after an electronic control unit of the chainsaw detects that the prime mover has stopped.

Further aspects of the invention are provided by one or more of the following embodiments:

Embodiment 1. A chainsaw comprising: a housing; a guide bar extending from the housing; a chain dispose around the guide bar and driven by a prime mover; a user input controlling movement of the chain about the guide bar; and a lubrication system that provides lubricant to the chain, the lubrication system comprising: a reservoir housing the lubricant; a fluid conduit extending between the reservoir and a location adjacent to the chain; a pump configured to move lubricant from the reservoir to the location adjacent to the chain; and a valve disposed along the fluid conduit, the valve having a lubricant inlet that receives lubricant from the reservoir, an air inlet, and an outlet that provides lubricant to the location adjacent to the chain, wherein the valve is movable between an open position whereby lubricant passes from the lubricant inlet to the outlet and a closed position whereby the outlet is in fluid communication with the air inlet, and wherein the valve moves between the open and closed positions in response to the user input.

Embodiment 2. The chainsaw of any one or more of the embodiments, wherein the user input comprises a trigger, wherein the valve moves to the open position when the trigger is activated, and wherein the valve moves to the closed position when the trigger is deactivated.

Embodiment 3. The chainsaw of any one or more of the embodiments, wherein the valve is delayed from moving to the closed position when the trigger is deactivated by a delay time associated with a time required to stop movement of the chain.

Embodiment 4. The chainsaw of any one or more of the embodiments, wherein the lubrication system further comprises: an actuator that moves the valve between the open and closed positions; and an electronic control unit configured to operate the actuator in response to a relative position of the user input.

Embodiment 5. The chainsaw of any one or more of the embodiments, wherein the lubrication system further comprises an interface disposed between the actuator and the valve, the interface comprising a first pocket that receives an arm of the actuator and a second pocket that receives a handle of the valve, and wherein the interface is configured to transfer torque from the actuator to the valve.

Embodiment 6. The chainsaw of any one or more of the embodiments, wherein the air inlet comprises an air filter.

Embodiment 7. The chainsaw of any one or more of the embodiments, wherein at least a portion of the lubrication system is disposed at a location external to the housing, and wherein an exposed portion of the lubrication system is disposed within an enclosure interfaced with the housing.

Embodiment 8. A lubrication system for a chainsaw, the lubrication system comprising: a reservoir housing a lubricant; a fluid conduit extending between the reservoir and a location adjacent to a chain of the chainsaw; a pump configured to move lubricant from the reservoir to the location adjacent to the chain; and a valve disposed along the fluid conduit, the valve having a lubricant inlet that receives lubricant from the reservoir, an air inlet, and an outlet that provides lubricant to the location adjacent to the chain, wherein the valve is movable between an open position whereby lubricant passes from the lubricant inlet to the outlet and a closed position whereby the outlet is in fluid communication with the air inlet, and wherein the valve moves between the open and closed positions in response to a user input.

Embodiment 9. The lubrication system of any one or more of the embodiments, wherein the valve is a three-way valve, and wherein the valve is moved between the open and closed positions by an actuator controlled by an electronic control unit in response to a relative position of the user input.

Embodiment 10. The lubrication system of any one or more of the embodiments, wherein the user input comprises a trigger, wherein the valve moves to the open position when the trigger is activated, and wherein the valve moves to the closed position when the trigger is deactivated.

Embodiment 11. The lubrication system of any one or more of the embodiments, wherein the valve is delayed from moving to the closed position when the trigger is deactivated by a delay time associated with a time required to stop movement of the chain.

Embodiment 12. The lubrication system of any one or more of the embodiments, wherein the lubrication system further comprises an interface disposed between the actuator and the valve, the interface comprising a first pocket that receives an arm of the actuator and a second pocket that receives a handle of the valve, and wherein the interface is configured to transfer torque from the actuator to the valve.

Embodiment 13. The lubrication system of any one or more of the embodiments, wherein the electronic control unit is further configured to control a prime mover of the chainsaw.

Embodiment 14. The lubrication system of any one or more of the embodiments, further comprising an air filter disposed in fluid communication with the air inlet.

Embodiment 15. A method of operating a chainsaw, the method comprising: activating a trigger of the chainsaw to initiate a prime mover of the chain saw, the prime mover being coupled to a chain of the chainsaw; and instructing an actuator to reconfigure a valve of a lubrication system of the chainsaw from a closed position to an open position in response to the activated trigger, wherein in the closed position the valve permits airflow through the valve, and wherein in the open position the valve permits lubricant to flow from a reservoir to a location adjacent to the chain.

Embodiment 16. The method of any one or more of the embodiments, further comprising instructing the actuator to reconfigure the valve from the open position to the closed position in response to deactivating the trigger, wherein reconfiguring the valve to the closed position is performed after a delay time associated with a time required to stop movement of the chain.

Embodiment 17. The method of any one or more of the embodiments, wherein reconfiguring the valve to the closed position is performed after movement of the prime mover terminates.

Embodiment 18. The method of any one or more of the embodiments, wherein instructing the actuator is performed by an electronic control unit of the chainsaw.

Embodiment 19. The method of any one or more of the embodiments, wherein activating the trigger causes the prime mover to drive the chain, wherein the prime mover is further coupled with a pump of the lubrication system, and wherein activating the trigger causes the prime mover to drive the pump.

Embodiment 20. The method of any one or more of the embodiments, wherein the lubrication system comprises an interface disposed between the actuator and the valve, the interface comprising a first pocket that receives an arm of the actuator and a second pocket that receives a handle of the valve, and wherein the interface is configured to transfer torque from the actuator to the valve.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A chainsaw comprising:
a housing;
a guide bar extending from the housing;
a chain dispose around the guide bar and driven by a prime mover;
a user input controlling movement of the chain about the guide bar; and
a lubrication system that provides lubricant to the chain, the lubrication system comprising:
a reservoir housing the lubricant;
a fluid conduit extending between the reservoir and a location adjacent to the chain;
a pump configured to move lubricant from the reservoir to the location adjacent to the chain; and
a valve disposed along the fluid conduit, the valve having a lubricant inlet that receives lubricant from the reservoir, an air inlet, and an outlet that provides lubricant to the location adjacent to the chain,
wherein the valve is movable between an open position whereby lubricant passes from the lubricant inlet to the outlet and a closed position whereby the outlet is in fluid communication with the air inlet, and wherein the valve moves between the open and closed positions in response to the user input.

2. The chainsaw of claim 1, wherein the user input comprises a trigger, wherein the valve moves to the open position when the trigger is activated, and wherein the valve moves to the closed position when the trigger is deactivated.

3. The chainsaw of claim 2, wherein the valve is delayed from moving to the closed position when the trigger is deactivated by a delay time associated with a time required to stop movement of the chain.

4. The chainsaw of claim 1, wherein the lubrication system further comprises:
an actuator that moves the valve between the open and closed positions; and
an electronic control unit configured to operate the actuator in response to a relative position of the user input.

5. The chainsaw of claim 4, wherein the lubrication system further comprises an interface disposed between the actuator and the valve, the interface comprising a first pocket that receives an arm of the actuator and a second pocket that receives a handle of the valve, and wherein the interface is configured to transfer torque from the actuator to the valve.

6. The chainsaw of claim 1, wherein the air inlet comprises an air filter.

7. The chainsaw of claim 1, wherein at least a portion of the lubrication system is disposed at a location external to the housing, and wherein an exposed portion of the lubrication system is disposed within an enclosure interfaced with the housing.

8. A lubrication system for a chainsaw, the lubrication system comprising:
a reservoir housing a lubricant;
a fluid conduit extending between the reservoir and a location adjacent to a chain of the chainsaw;

a pump configured to move lubricant from the reservoir to the location adjacent to the chain; and a valve disposed along the fluid conduit, the valve having a lubricant inlet that receives lubricant from the reservoir, an air inlet, and an outlet that provides lubricant to the location adjacent to the chain, wherein the valve is movable between an open position whereby lubricant passes from the lubricant inlet to the outlet and a closed position whereby the outlet is in fluid communication with the air inlet, and wherein the valve moves between the open and closed positions in response to a user input.

9. The lubrication system of claim 8, wherein the valve is a three-way valve, and wherein the valve is moved between the open and closed positions by an actuator controlled by an electronic control unit in response to a relative position of the user input.

10. The lubrication system of claim 9, wherein the user input comprises a trigger, wherein the valve moves to the open position when the trigger is activated, and wherein the valve moves to the closed position when the trigger is deactivated.

11. The lubrication system of claim 10, wherein the valve is delayed from moving to the closed position when the trigger is deactivated by a delay time associated with a time required to stop movement of the chain.

12. The lubrication system of claim 9, wherein the lubrication system further comprises an interface disposed between the actuator and the valve, the interface comprising a first pocket that receives an arm of the actuator and a second pocket that receives a handle of the valve, and wherein the interface is configured to transfer torque from the actuator to the valve.

13. The lubrication system of claim 9, wherein the electronic control unit is further configured to control a prime mover of the chainsaw.

14. The lubrication system of claim 8, further comprising an air filter disposed in fluid communication with the air inlet.

15. A method of operating a chainsaw, the method comprising:

providing a chainsaw having a lubrication system comprising a reservoir housing a lubricant, a fluid conduit extending between the reservoir and a location adjacent to a chain, a pump configured to move lubricant from the reservoir to the location adjacent to the chain, and a valve disposed along the fluid conduit, the valve having a lubricant inlet that receives lubricant from the reservoir, an air inlet, and an outlet that provides lubricant to the location adjacent to the chain, wherein the valve is movable between an open position whereby lubricant passes from the lubricant inlet to the outlet and a closed position whereby the outlet is in fluid communication with the air inlet, and wherein the valve moves between the open and closed positions in response to the user input;

activating a trigger of the chainsaw to initiate a prime mover of the chain saw, the prime mover coupled to the chain; and reconfiguring the valve from the closed position to the open position in response to activating the trigger, wherein in the closed position the valve permits airflow through the valve from the air inlet of the valve, and wherein in the open position the valve permits lubricant to flow from the reservoir through the lubricant inlet to the location adjacent to the chain.

16. The method of claim 15, further comprising instructing the actuator to reconfigure the valve from the open position to the closed position in response to deactivating the trigger, wherein reconfiguring the valve to the closed position is performed after a delay time associated with a time required to stop movement of the chain.

17. The method of claim 16, wherein reconfiguring the valve to the closed position is performed after movement of the prime mover terminates.

18. The method of claim 15, wherein instructing the actuator is performed by an electronic control unit of the chainsaw.

19. The method of claim 15, wherein activating the trigger causes the prime mover to drive the chain, wherein the prime mover is further coupled with the pump of the lubrication system, and wherein activating the trigger causes the prime mover to drive the pump.

20. The method of claim 15, wherein the lubrication system comprises an interface disposed between the actuator and the valve, the interface comprising a first pocket that receives an arm of the actuator and a second pocket that receives a handle of the valve, and wherein the interface is configured to transfer torque from the actuator to the valve.

* * * * *